United States Patent [19]

Ikeda

[11] 3,810,242

[45] May 7, 1974

[54] CASSETTE-TYPE MAGNETIC TAPE RECORDING AND REPRODUCING APPARATUS

[75] Inventor: Hisao Ikeda, Osaka, Japan

[73] Assignee: Matsushita Electric Industrial Co., Ltd., Osaka, Japan

[22] Filed: July 15, 1971

[21] Appl. No.: 163,039

Related U.S. Application Data

[63] Continuation of Ser. No. 783,947, Dec. 16, 1968, Pat. No. 3,622,162.

[30] Foreign Application Priority Data

Feb. 12, 1968 Japan .................................. 43-9323
Feb. 12, 1968 Japan .................................. 43-9327

[52] U.S. Cl. .................................................. 274/4 C
[51] Int. Cl. .................................................. G11b 5/00
[58] Field of Search ............. 242/198; 274/4 R, 4 E, 274/4 C, 4 D, 11 C, 11 D, 11 E

[56] References Cited

UNITED STATES PATENTS 3,432,169 3/1969 Schroder ............................ 274/4 E

*Primary Examiner*—Harry N. Haroian
*Attorney, Agent, or Firm*—Stevens, Davis, Miller & Mosher

[57] ABSTRACT

A tape cassette ejecting device for use with a small-sized cassette-type magnetic recording and reproducing apparatus in which a cassette lifting means is operatively connectable with an operation mode change-over lever of the apparatus for selecting the state of operation to allow lifting of a cassette mounted in the apparatus only in its inoperative state. The ejecting device comprises a manual push button carried on a base plate of the apparatus over the change-over lever movable along the base plate for causing pivotal movement of the lifting means, and a projection provided in the button for rendering it immovable. The blocking projection is loosely received into an opening specified in the change-over lever when the lever is displaced in its inoperative state.

4 Claims, 15 Drawing Figures

CASSETTE-TYPE MAGNETIC TAPE RECORDING AND REPRODUCING APPARATUS

CROSS-REFERENCE TO RELATED APPLICATIONS

This is a division of Ser. No. 783,947, filed Dec. 16, 1968, now U.S. Pat. No. 3,622,162, issued Nov. 23, 1971; this application is also related to co-pending Ser. No. 165,790, filed July 15, 1971.

This invention relates to a cassette-type magnetic tape recording and reproducing apparatus and more particularly to such a cassette-type magnetic tape recording and reproducing apparatus of compact structure wherein secondary operation switching means is cooperatively associated with primary operation switching means for shifting a tape driving system to a different state of operation, such as a state of recording or reproducing or a state of rewinding, in such a manner that when the primary operation switching means is shifted to a rewinding position, the state of rewinding and the state of fast forwarding are obtained selectively depending upon the position of the secondary operation switching means.

Magnetic tape recorders of the type which is designed for use with a cartridge tape and wherein different states of a tape driving system, i.e., the recording state, the reproducing state, the fast forwarding state, the rewinding state and the inoperative state, are selectively obtained by operating operation switching means, are well known. For instance, German Utility Model No. 1,896,300 discloses a cassette-type magnetic tape recorder of the type which has an opening formed in one side wall of an outer casing for the introduction of a tape running mechanism and a pinch roller and another opening formed in the bottom wall of said casing for the introduction of a driving rotary shaft therethrough.

However, without exception the conventional magnetic tape recorders of the type described have been complicated in operation due to their structure, and no magnetic tape recorder has ever been made available which performs all of the functions processed by conventional large-sized magnetic tape recorders, in so small a size as to be portable and which provides high performance.

The present invention contemplates the provision of a cassette-type magnetic tape recording and reproducing apparatus which overcomes the aforesaid drawbacks, e.g., such a cassette-type magnetic tape recording and reproducing apparatus which is so designed that all of the operations can be obtained by operating two levers; which is provided with many new means, such as cassette removing means and dual recording preventing means; and which yet is extremely small in size.

It is, therefore, the primary object of the present invention to provide a cassette-type magnetic tape recording and reproducing apparatus which comprises primary operation switching means which is revolved between two positions for shifting a tape driving system to selectively obtain different states of operation, such as a state of recording or reproduction and a state of rewinding, and secondary operation switching means cooperatively associated with said primary operation switching means, the arrangement being such that when the primary operation switching means is in one of said two positions, the state of recording or reproduction is obtained, while when the primary operating switching means is in another position, the state of rewinding and a state of fast forwarding are obtained selectively depending upon the position of the secondary operation switching means, whereby not only the state of recording or reproduction is obtained by the operation of the primary operation switching means but also the state of rewinding and the state of fast forwarding can be obtained by revolving the primary operation switching means in the same direction after previously setting the secondary operation switching means; and which therefore is highly rational in structural arrangement and compact in form.

It is another object of the invention to provide a cassette-type magnetic tape recording and reproducing apparatus which comprises a leaf spring of magnetic material connected to a base plate at one end thereof to effect pressure contact of the driving shaft of a motor with a rotary body, said leaf spring being located between said motor and a recording and reproducing head during recording and reproducing operations to shield the magnetic flux generated by the motor, whereby a static adverse effect of the motor on the recording and reproducing head is eliminated and a satisfactory recording or reproduction characteristic of improved signal to noise ratio can always be obtained, and further the necessity of providing a separate shielding plate can be eliminated.

Other objects, features and advantages of the invention will be better understood from the following detailed description taken in connection with the accompanying drawings in which.

Figure 1:
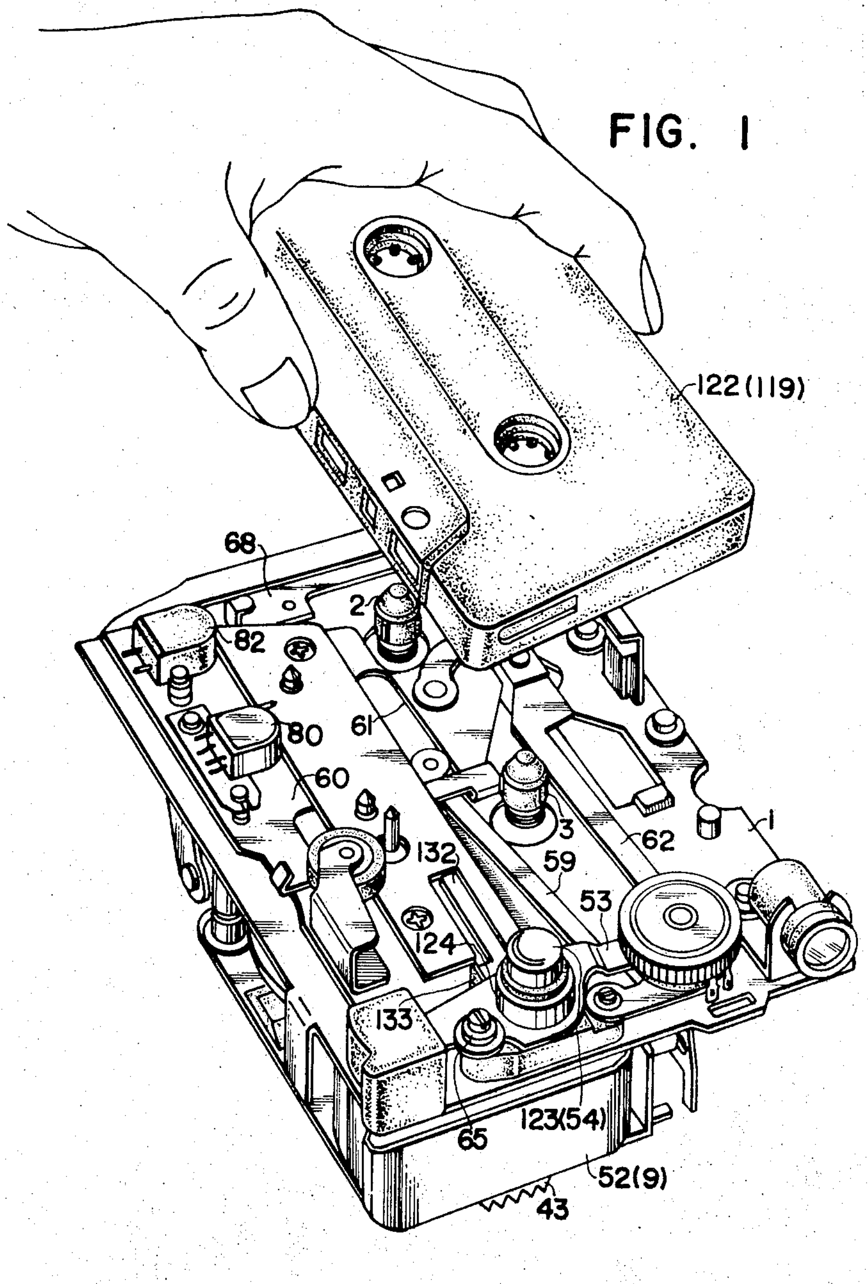
FIG. 1 is a perspective view of an embodiment of the cassette-type magnetic tape recording and reproducing apparatus according to the present invention.
Figure 2:
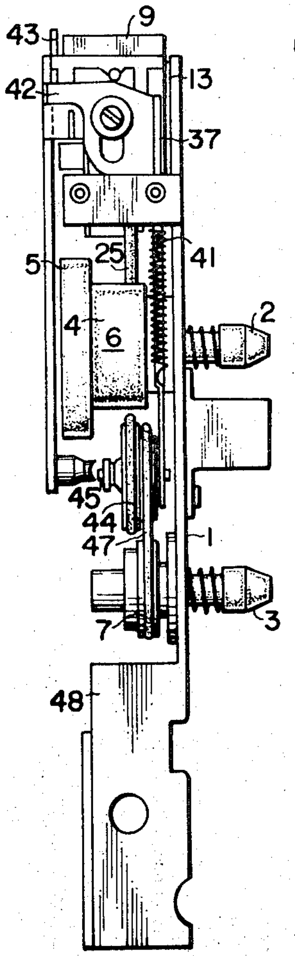
FIG. 2 is a side view of one form of the magnetic tape recording and reproducing apparatus of this invention.

An embodiment of the present apparatus will be described hereunder with reference to FIGS. 2 to 8 inclusive. Two reel shafts 2, 3 are rotatably mounted through a main base plate 1 with a predetermined distance therebetween. A stepped winding reel pulley 6 having a smaller diameter portion 4 and a larger diameter portion 5 is mounted on that end of the reel shaft 2 located below the base plate 1, while a rewinding reel pulley 7 is mounted on that end of the other reel shaft 3 located below the base plate 1.

Operation switching means 9 is rotatably mounted on the main base plate 1 by means of a pivot pin 8. The arrangement is such that when the operation switching means 9 is revolved in the direction of arrow A, the operating system of the apparatus is shifted for recording or reproduction, while when said operation switching means is revolved in the direction of arrow B, the operating system is shifted for rewinding or fast forwarding.

Namely, the operation switching means 9 has two operating portions one of which is adapted to operate a sliding lever 11 connected thereto by means of a pin 10, and the other is adapted to operate a cam lever 13 rotatably mounted on the base plate 1 by means of a pin 12.

By a rotational movement of the operation switching means 9, the sliding lever operated by one of the operations of said operation switching means is caused to slide in the direction of arrow C or in an opposite direction while being guided by pins 14 which are projecting from the base plate 1 and received in respective slots 15 formed in said sliding lever, and by this sliding movement of the sliding lever, an idler lever to be described later is operated by a flexed lug 16 provided at a portion of said sliding lever 11 and transmission of a drive from the driving motor is controlled by a bent lug 17 formed at the other portion of said lever.

Levers 19, 20 are pivotally connected at one end thereof to the opposite ends of an idler lever 18 controlled by the sliding lever 11 by pins 21, 22 respectively and idlers 25, 26 of substantially the same diameter are rotatably mounted on the other ends of said respective levers 19, 20 in different levels by pins 23, 24. The idler lever 18 is fitted at the central portion thereof on a stud 29 provided at the central portion of a lever 28 which is pivotably mounted on the base plate 1 by a pivot pin 27.

The idler lever 18 is operatively associated with the sliding lever 11 to be controlled thereby, by means of a leaf spring 30 which is connected to one side of said idler lever at one end, with the other end thereof being held in engagement with the lug 16 of said sliding lever 11, so that the idler lever 18 is yieldably urged to rotate upon the sliding movement of said sliding lever.

The idler 25 carried by the idler lever 18 through the lever 19 is arranged for abutment against the peripheral surface of the larger diameter portion 5 of the aforesaid reel pulley 6, whereas the idler 26 also carried by the idler lever 18 through the lever 20 is arranged for abutment against the peripheral surface of the small diameter portion 4 of said reel pulley 6. Further, the idler 25 is also engageable with a bushing 33 on a capstan shaft 31 by which a flywheel 32 is rotatably mounted on the base plate 1 on the underside thereof, and the other idler 26 is engageable with the peripheral surface of said flywheel 32. Such arrangement of the idlers 25, 26 relative to the larger diameter portion 5 and the smaller diameter portion 4 of the reel pulley 6, the flywheel 32 and the bushing 33 as described above, is made for the purpose of obtaining a normal forwarding speed and a fast forwarding speed of the tape by varying the rate of rotation transmitted from the flywheel 32 to the reel pulley 6. The flywheel 32 is driven from the driving motor 34 which is rotatably mounted on the base plate 1 with the driving shaft 35 thereof in pressure contact with the peripheral edge portion of said flywheel. The engagement between the driving shaft 35 of the motor 34 and the flywheel 32 is controlled by a rotational movement of said motor caused by the lug 17 of the sliding lever 11 when said sliding lever is caused to make a sliding movement by the operation of the operation switching means 9.

The cam lever 13 which is operated by another operating portion of the operation switching means 9, has an arcuate edge at a portion which is in contact with a pin 36 of said operation switching means 9, so that the cam lever 13 will be held immovably when the operation switching means 9 is revolved in the direction of arrow A and will be revolved in the direction of arrow D when the operation switching means is revolved in the direction of arrow B. Below the cam lever 13 is provided a switching lever 37 which is mounted on a bearing of the reel shaft 2 for sliding movement in the direction of arrow E and for a rotational movement. The switching lever 37 is operatively connected with the cam lever 13, with a pin 38 provided on said cam lever being received in a hole 39 formed in said switching lever 37. Further, the switching lever 37 is biased by a spring 41, having one end anchored to a portion of said switching lever and the other end anchored to a pin 40 on the base plate 1, in such a manner that a component of the biassing force is directed in a direction for contacting the cam lever 13 with the pin 36 of the operation switching means 9 under pressure.

The other end of the pivotable lever 28 which carries the idler lever 18 thereon, is connected to a portion of an operating lug 42 of the switching lever 37, so that the idlers 25, 26 may also be controlled by said switching lever 37.

The operating lug 42 of the switching lever 37 is also adapted to engage one end of secondary operation switching means 43 which is movable along the underside of the operation switching means 9 in the direction of arrow F by being guided by the pin 8. When the operation switching means 9 is revolved in the direction of arrow B, with the operating lug 42 of switching lever 37 in engagement with the secondary operation switch means 43, the cam lever 13 is revolved in the direction of arrow D and thereby a movement of the switching lever 37 in the direction of arrow E under the biasing force of the spring 41 is prevented.

An idler 44 adapted for pressure contact with the peripheral surface of the flywheel 32 is rotatably mounted on the switching lever 37 by a pin 45. This idler 44 is brought into pressure contact with the peripheral surface of the flywheel 32 upon movement of the switching lever 37 in the direction of arrow E, whereby the drive of the motor is transmitted from said flywheel to the reel shaft 3 through a belt 47 which is engaged around a pulley 46 integral with said idler 44 and the reel pulley 7 integral with said reel shaft 3. The base plate 1 is provided with a source battery accommodating portion 48.

Figure 3:
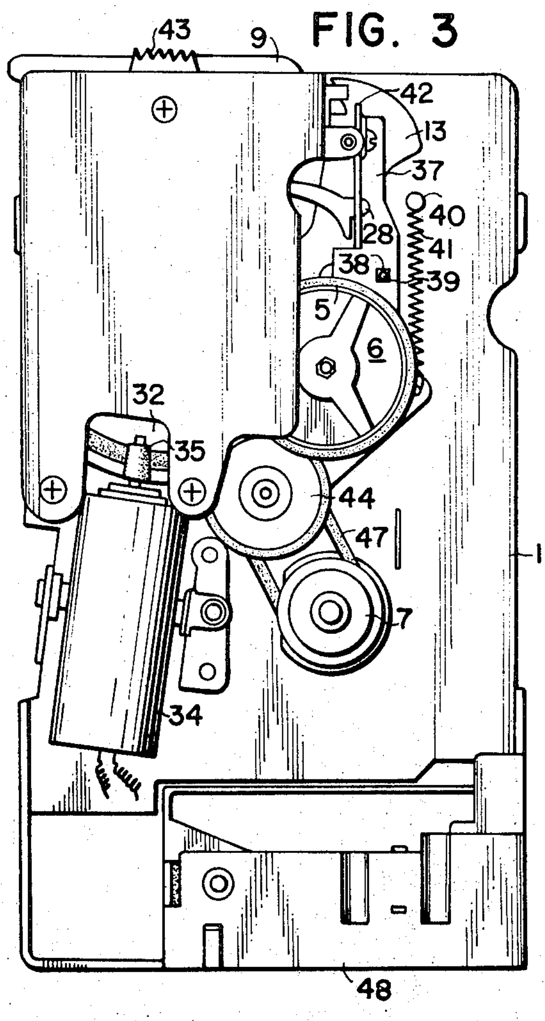
FIG. 3 is a bottom view of the magnetic tape recording and reproducing apparatus.
Figure 4:
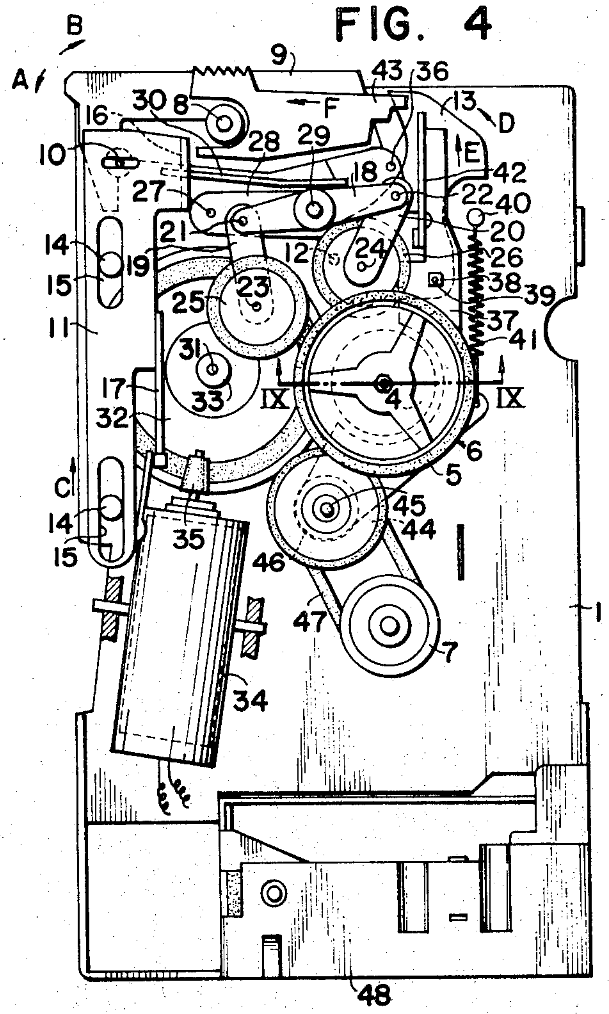
FIG. 4 is a bottom view of the magnetic tape recording and reproducing apparatus in an inoperative position with a bottom base plate removed.

The mechanism constructed as described above will operate in the following manner: Namely, when the apparatus is inoperative, as shown in FIGS. 3 and 4, the operation switching means 9 is held in parallel with the side face of the base plate 1 and the sliding lever 11 to be controlled by said operation switching means is located centrally of its moving range. Further, since the idler lever 18 is not biased, the idlers 25, 26 are disengaged from the flywheel 32 and the reel pulley 6 respectively, and the cam lever 13 is revolved by the pin 36 of the operation switching means 9 in a direction opposite to the arrow D against the biasing force of the spring 41 acting thereon through the switching lever 37. Accordingly, the switching lever 37 is moved in a direction opposite to the arrow E, holding the idler 44 disengaged from the flywheel 32.

The inoperative position of the mechanism described above may be shifted to a recording or reproducing position by revolving the operation switching means 9 in the direction of arrow A.

Figure 5:
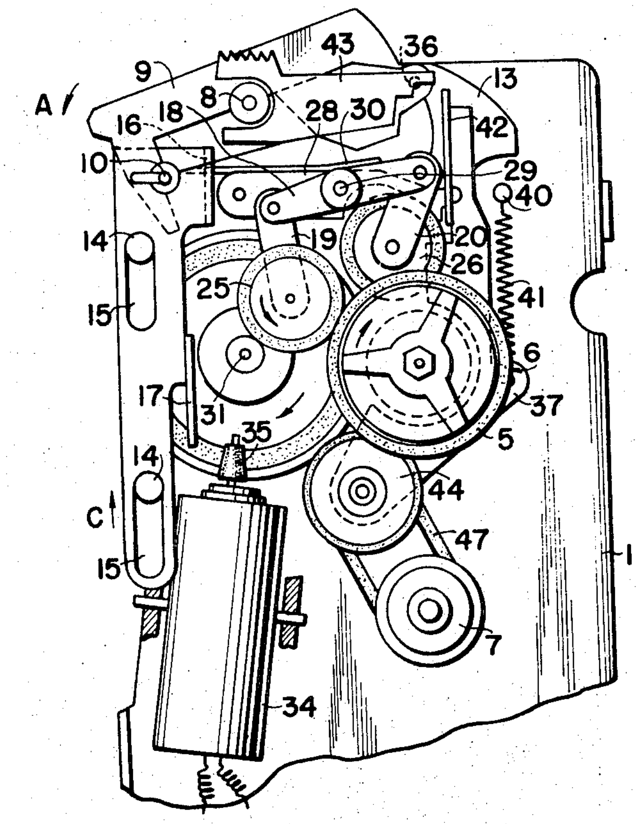
FIG. 5 is a bottom view of the apparatus with the bottom base plate removed, showing the relative positions of principal parts during normal tape forwarding operation.

Namely, by revolving the operation switching means 9 in the direction of arrow A, the sliding lever 11 is displaced toward the motor 34, connecting said motor with a power source and bringing the driving shaft 35 of said motor into pressure contact with the peripheral edge portion of the flywheel 32, where by the flywheel 32 is driven from the motor. On the other hand, the idler lever 18 is biased under the biasing force of the leaf spring 30, incident to displacement of the lug 17 of the sliding lever 11, with the result that the idler 25 is brought into pressure contact with the bushing 33 of the flywheel 32 and the peripheral surface of the larger diameter portion 5 of reel pulley 6, while the idler 26 is further moved away from the flywheel 32 and the reel pulley 6, as shown in FIG. 5. Thus, the drive of the driving motor is transmitted from the flywheel 32 to the reel shaft 2 to effect normal forwarding of the tape. The cam lever 13, however, remains in its position on revolution of the operation switching means 9 in the direction of arrow A, so that the switching lever 37 is held stationary, and therefore, the idler 44 is held in its inoperative position shown in FIG. 4. The above-described operation of shifting the mechanism from the inoperative state to the recording or reproduction state has nothing to do with the operation of the secondary operation switching means 43 because the switching lever 37 is not actuated by the cam lever 13. When the normal forwarding of the tape is desired to be stopped, this can be attained by returning the operation switching means to its original position. Namely, by the return movement of the operation switching means 9, the sliding lever 11 is returned to its original position, so that the idler 25 is disengaged from the bushing 33 of the flywheel 32 and the reel pulley 6 and thus the mechanism is returned to the inoperative position shown in FIG. 4.

Next, when the mechanism is desired to be shifted to a rewinding state, the secondary operation switching means 43 is moved in the direction of arrow F first so as to prevent the same from being engaged by the operating lug 42 of the switching lever 37, and then the operation switching means 9 is revolved in the direction of arrow B.

Figure 7:
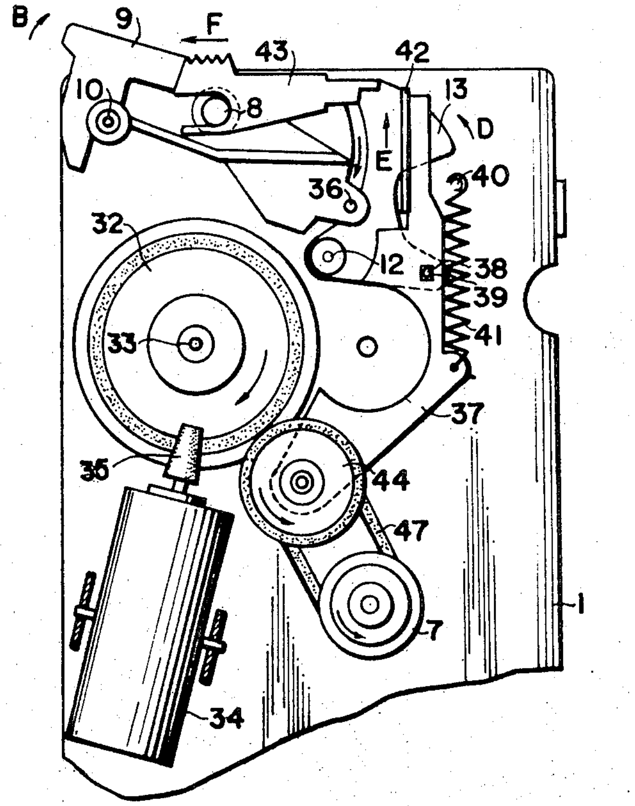
FIG. 7 is a bottom view of the apparatus illustrating the operation of a lever during tape rewinding operation.

Namely, by revolving the operation switching means 9 in the direction of arrow B after the secondary operation switching means 43 is operated to a position in which it is not engageable with the switching lever 37, the sliding lever 11 is displaced in a direction opposite to the motor 34, whereby said motor 34 is connected to the power source and its driving shaft 35 is brought into pressure contact with the peripheral edge portion of the flywheel 32 to transmit the drive of the motor to said flywheel. On the other hand, the idler lever 18 is caused to make a pivotal movement under the biasing force of the leaf spring 30 produced by displacement of the lug 16 of the sliding lever 11, with the result that the idler 25 is further moved away from the bushing 33 and the reel pulley 6, while the idler 26 is urged toward the peripheral surface of the flywheel 32 and the smaller diameter portion 4 of the reel pulley 6 for pressure contact therewith. In this case, however, since the pin 36 carried on the operation switching means 9 moves inwardly as shown in FIG. 7, the cam lever 13 is revolved in the direction of arrow D under the biasing force of the spring 41 acting thereon through the switching lever 37 and the switching lever 37 is also moved in the direction of arrow E, causing the idler lever 18 to rotate in the same direction as the arrow D in the direction of which the cam lever 13 is revolved, and the idler 26 is also moved away from the peripheral surface of the flywheel 32 and the peripheral surface of the smaller diameter portion 4 of reel pulley 6. Thus, both of the idlers 25 and 26 are kept away from the flywheel 32 and the reel pulley 6.

Figure 6:
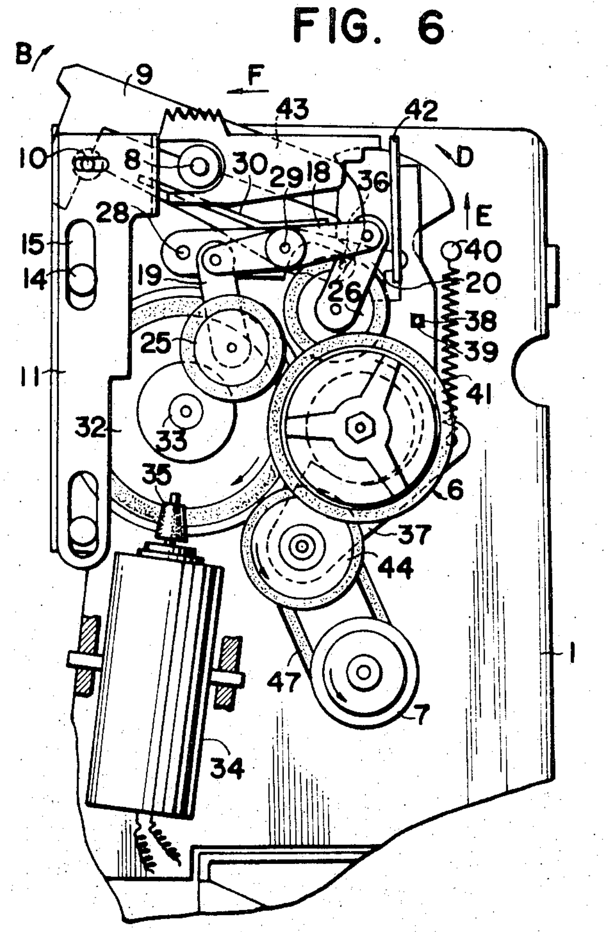
FIG. 6 is a bottom view of the apparatus showing the relative positions of the principal parts during tape rewinding operation.

On the other hand, the idler 44 is brought into pressure contact with the peripheral surface of the flywheel 32 incident to the movement of the switching lever 37 in the direction of arrow E, so that the drive of the motor is transmitted from the flywheel through the belt 47 to the reel pulley 7 to drive the same as shown in FIG. 6. Thus, the reel shaft 3 is rotated to effect rewinding of the tape. The rewinding state of the mechanism may be released by returning the operation switching means 9 to its original position, whereby the inoperative state of the mechanism shown in FIG. 4, is obtained.

Now, when the mechanism is desired to be placed in a fast forward position, the secondary operation switching means 43 is moved in a direction opposite to the direction of arrow F first to provide for engagement between it and the operating lug 42 of the switching lever 37 and thereafter the operation switching means 9 is revolved in the direction of arrow B.

Figure 8:
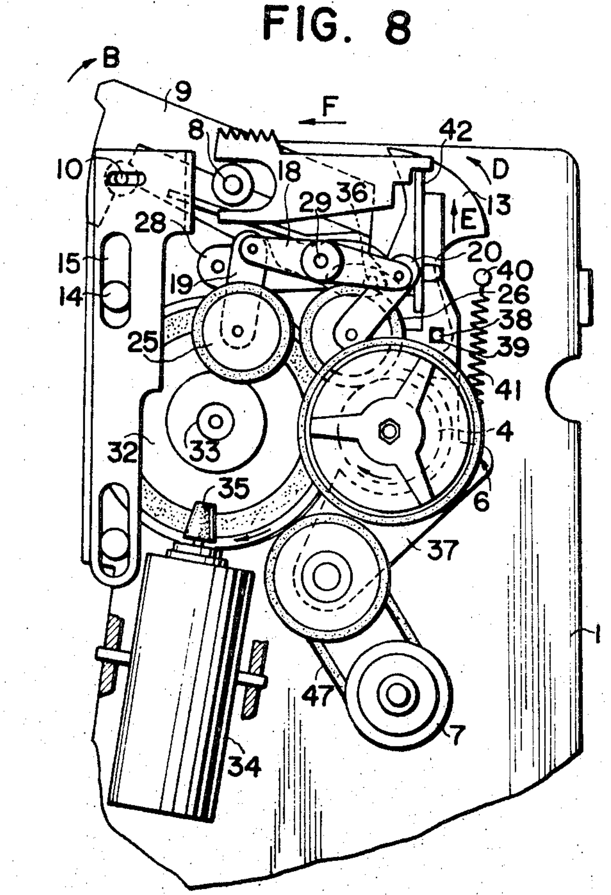
FIG. 8 is a bottom view of the apparatus showing the relative positions of the principal parts during fast tape forwarding operation.

Namely, when the operation switching means 9 is revolved in the direction of arrow B after moving the secondary operation switching means 43 to a position engageable with the switching lever, the sliding lever 11 is displaced in the same manner as in the case of shifting the mechanism to the rewinding state, so that the drive of the motor is transmitted to the flywheel 32. On the other hand, the idler lever 18 is caused to make a pivotal movement under the biasing force of the leaf spring 30 produced by the displacement of the lug 16 of sliding lever 11, with the result that the idler 25 is further moved away from the bushing 33 and the reel pulley 6, while the idler 26 is brought into pressure contact with the peripheral surface of the flywheel 32 and the smaller diameter portion of the reel pulley 6. The pressure contact between the idler 26, and the peripheral surface of the flywheel 32 and the smaller diameter portion 4 of the reel pulley 6, is maintained because, since movement of the switching lever 37 in the direction of arrow E is blocked by the secondary operation switching means 43, the pivotable lever 28 is not revolved at all, although the cam lever 13 tends to be revolved in the direction of arrow D, upon inward displacement of the pin 36 carried on the operation switching means 9, under the biasing force of the spring 41 acting thereon through the switching lever 37. Consequently, the rotation of the flywheel 32 is transmitted to the reel pulley 6 through the idler 26 as shown in FIG. 8 and thus the reel shaft 2 is driven to effect fast forwarding of the tape.

During the fast forwarding operation, the switching lever 37 is not moved at all and accordingly the idler 44 is not brought into contact with the flywheel 32. The fast forwarding state described above may be released by returning the operation switching means 9 to its original position, as in the case of releasing the rewinding state.

The dual recording preventing mechanism of this invention is described in U.S. Pat. No. 3,662,162 and copending application Ser. No. 165,790 and the pertinent portions of the disclosures of said patent and application are incorporated herein by reference.

Figure 9:
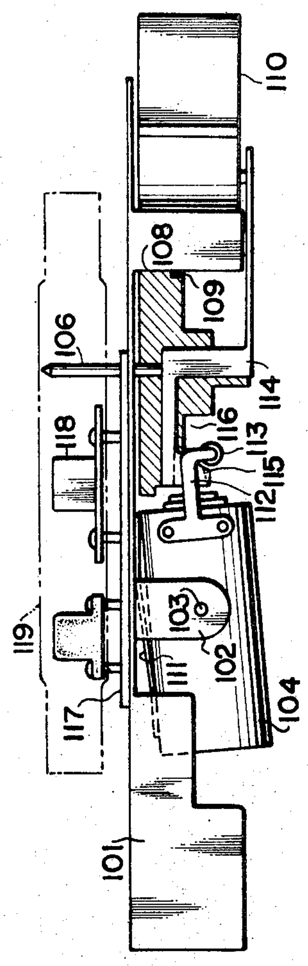
FIG. 9 is a side view mainly showing in section the magnetism shielding means for a driving motor in the present apparatus in an inoperative state.
Figure 10:
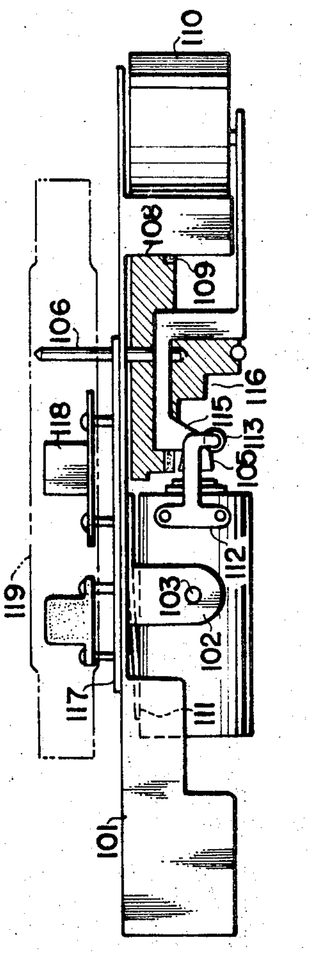
FIG. 10 is a side view, similar to FIG. 9, showing in section the position of the means in a recording or reproducing state.
Figure 11:
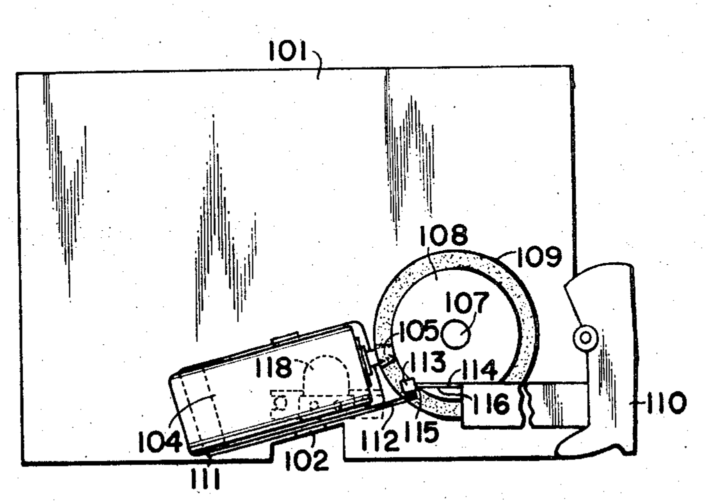
FIG. 11 is a bottom view of FIG. 9.

Magnetic shielding means for the driving motor, used in the present apparatus will be described next with reference to FIGS. 9 to 11 inclusive. The driving motor 104 is rotatably mounted on a bracket 102, fitted to the base plate 101 of the apparatus, by a pivot pin 103, and a truncated cone-shaped roller 105 of resilient material, such as rubber, is fitted to the tip end of the driving shaft thereof.

The flywheel 108 is mounted on the shaft of the capstan 106 which is rotatably supported by a bearing 107 and has an annular member 109 of resilient material, such as rubber, fitted along the peripheral edge portion of the underside thereof for engagement with the aforesaid roller 105. The contact between the annular member 109 of the flywheel 108 and the roller 105 is controlled by the operation switching means 110 by which the magnetic tape recording and reproducing apparatus is shifted from the inoperative state to the recording state, reproducing state or rewinding state. Namely, the motor 104 is biased in a direction to keep the roller 105 in pressure contact with the annular member 109 on the flywheel 108 by a leaf spring 111 which is made of a magnetic material and fixed to the base plate 101 at one end thereof. When the apparatus is in operation, the roller 105 is held in pressure contact with the annular member 109 on the flywheel 108 under the biasing force of the leaf spring 111 and thus the drive of the motor is transmitted to the flywheel. When the apparatus is inoperative, however, a roller 113 at the tip end of a motor control plate 112 connected to the motor 104 rests on the lobe 115 of a cam plate 114 which is operatively connected to the operation switching means 110, holding the roller 105 out of engagement with the annular member 109 against the biasing force of the leaf spring 111. As the magnetic tape recording and reproducing apparatus is shifted to the state of recording or reproduction by means of the operation switching means 110, the roller 113 carried on the motor control plate 112 moves into a recess 116 of the cam plate 114, allowing the motor 104 to rotate under the biasing force of the leaf spring 111 and thus the roller 105 is brought into pressure contact with the annular member 109 on the flywheel 108. The leaf spring 111 is so shaped as to cover the top surface of the motor 104 substantially entirely and located between said motor and the recording and reproducing head 118 on the movable base plate 117 when said recording and reproducing head is located in the recording and reproducing position upon sliding movement of said movable base plate on the base plate 101 caused by the operation of the operation switching means 110.

Since the leaf spring 111 is made of a magnetic material, it shields the recording and reproducing head 118 against the line of magnetic force extending from the motor 104 during recording or reproducing operation. Namely, an external influence on the recording or reproducing operation can be markedly reduced and a recording or reproducing characteristic of excellent signal to noise ratio can be obtained. In the figures, reference numeral 119 designates a tape cartridge.

Now, cassette lifting means used in the present apparatus will be described with reference to FIGS. 12 to 15 inclusive. The cassette lifting means includes a cassette lifting button 123 disposed in a guide 124 provided on the base plate 121 of the magnetic tape recording and reproducing apparatus. The guide 124 is cylindrical in shape and has an inwardly extending flange 125 at the top edge thereof.

The cassette lifting button 123 is substantially T-shaped in vertical cross section and comprises a top wall 126, a cylindrical side wall 127 extending downwardly from the peripheral of said top wall and an outwardly extending flange 128 formed at the lower edge of said side wall and adapted to slide on the inside wall of the guide 124 for abutment against the inwardly extending flange 125 of said guide.

The lifting button 123 also has a hollow shaft 129 which is extending axially downwardly from the top wall 126 with the bottom end thereof vertically movably received in a hole formed in the bottom wall 130 of the guide 124. A spring 131 is provided around the hollow shaft 129 with one end bearing against the inside surface of the top wall 126 and the other end against the bottom wall 130 of the guide 124. A cassette lifting lever 132 located adjacent to the lifting button 123 is pivotally mounted on a bearing 133, provided on the base plate 121, by a pivot pin 134. One end of the lifting lever 132 is in contact with the bottom end of the hollow shaft 129 of the lifting button 123 and the other end thereof is located beneath the bottom wall of a tape cartridge 122 mounted in the magnetic tape recording and reproducing apparatus.

Figure 15:
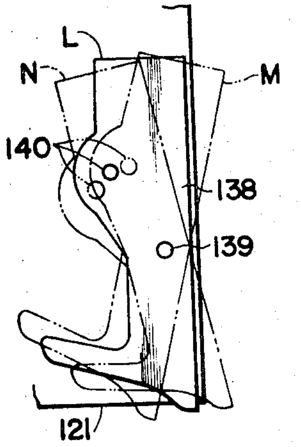
FIG. 15 is a top plan view showing an operation switching element associated with the cassette lifting means.
Figure 14:
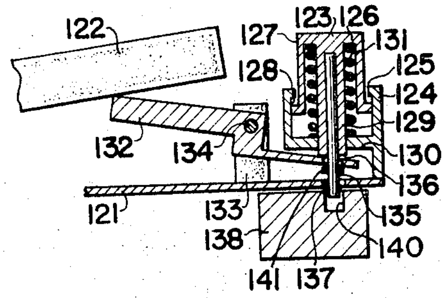
FIG. 14 is a sectional view showing the position of the cassette lifting means when actuated.

On the other hand, a pin 135 is inserted into the axial hollow of the hollow shaft 129 of the lifting button 123. The lower end of the pin 135 is extending further downwardly from the bottom end of the hollow shaft to pass through an aperture 136 formed in one end of the lifting lever 132 and an aperture 137 formed in the base plate 121 and located above the operation switching means 138 provided on the underside of the base plate 121. The operation switching means 138 is pivotably mounted on the base plate 121 by a pivot pin 139 and operatively associated with the tape driving system and the electric circuit system of the magnetic tape recording and reproducing apparatus, for example, in such a manner that said systems may be held in an inoperative state when the operation switching means is held in a position L with its longitudinal side face in parallel to the side wall of the base plate 121 as shown in FIG. 15;

in a state of rewinding or fast forwarding when said means is revolved in a clockwise direction to a position M; and in a state of recording or reproduction when said means is revolved in a counterclockwise direction to a position N.

The arrangement is such that the lower end of the pin 135, located above the operation switching means 138, is in alignment with a hole 140 formed in the top face of said means when said means is held in the inoperative position, that is, the position L, and is not in alignment with the hole 140 when said means is in the position M or N. Reference numeral 141 designates a ring provided on the pin 135 for the purpose of preventing the lifting lever 132 from making a pivotal movement at a time other than when said lifting lever is actuated by the lifting button.

The cassette lifting means constructed as described above will operate in the following manner: Namely, in the inoperative state of the apparatus as shown in FIGS. 18 and 19 the operation switching means 138 takes the position L shown in FIG. 15, with the hole 140 in alignment with the pin 135. If the normally upwardly urged lifting button 123 is depressed in this state against the biasing force of the spring 131, the lifting lever 132 is moved downwardly by the lower end of the hollow shaft 129 of said button and revolved in a clockwise direction, and at the same time the lower end of the pin 135 is received in the hole 140 in the operation switching means 138.

By the clockwise revolution of the lifting lever 132, the tape cartridge 122 mounted in the magnetic tape recording and reproducing apparatus is lifted at its bottom face by said lifting lever, so that said tape cartridge can be picked up by hand easily.

Figure 12:
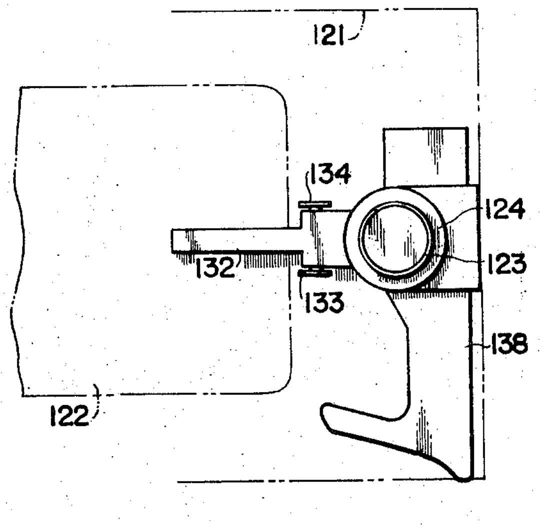
FIG. 12 is a top plan view mainly showing cassette lifting means in the present apparatus.
Figure 13:
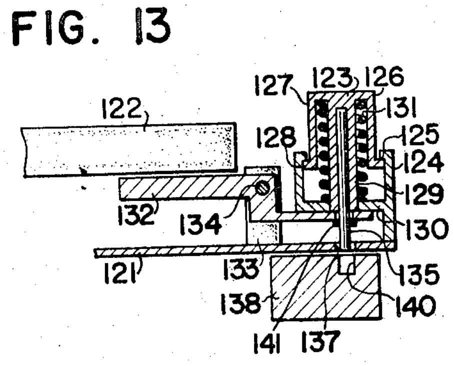
FIG. 13 is a sectional view of the cassette lifting means.

Upon removing the depression from the lifting button 123 after the tape cartridge 122 has been lifted, the cassette lifting means returns to its original position shown in FIGS. 12 and 13 under the biasing force of the spring 131.

However, when the operation switching means 138 is switched to the rewinding or fast forward position M or recording or reproduction position N, with the tape cartridge 122 being set in its operative position, the hole 140 in the operation switching means 138 is displaced. Therefore, if an attempt is made to lift the tape cartridge 122 by depressing the lifting button 123 in this state, the lower end of the pin 135 abuts against the top face of the operation switching means 138 and the lifting lever 132 is not caused to make a pivotal movement sufficient to lift the tape cartridge. Namely, the tape cartridge 122 cannot be lifted when the operation switching means 138 is held in the rewinding, fast forward, recording or reproduction position.

What is claimed is:

1. Apparatus for ejecting tape cassettes mounted in a magnetic tape recording and reproducing machine having a plurality of operating states, comprising:

a base plate;

a push button mounted on the base plate for movement in a direction substantially normal to the surface of said base plate;

a cassette lifting member pivotally mounted on said base plate, one end portion of said lifting member extending into a cassette receiving receptacle for contacting a cassette mounted therein and for lifting said mounted cassette at least partially out of said receptacle, the opposite end portion of said lifting member being coupled to said push button to translate the substantially linear movement of said push button into an arcuate movement of said one end portion of said lifting member;

an elongated member rigid with and extending from said push button; and an operating state selecting means for selecting one of said plurality of operating states of said machine, said selecting means including an operation change-over lever having an opening therein for receiving said elongated member in a first position of said lever and a depressed position of said push button, said lever having a second position wherein said opening therein is out of register with said elongated member, the surface of said lever thereby blocking movement of said push button into its depressed position.

2. The ejecting apparatus of claim 1, wherein said change-over lever and said push button are mounted on opposite sides of said base plate, said base plate having an opening therein through which said elongated member passes in the depressed position of said push button.

3. The cassette ejecting device according to claim 1, in which said push button has a resilient means to bias said push button out of the depressed position thereof.

4. A tape cassette lifting device for use in a cassette-type magnetic tape recording and reproducing apparatus in which the lifting device is operatively connected with a displaceable operation mode change-over means formed of a platelike material so as to be rendered operable when the apparatus is in its inoperative state, comprising a cassette lifting lever pivotally mounted on a base plate of the apparatus, having one end thereof contacting a cassette mounted in the base plate for ejecting the mounted cassette; a cassette lifting button connected with the other end of said lifting lever adapted to be manually actuated and disposed over the change-over means for selecting the state of operation, said button having a spring for resilient movement; a downward projection on the bottom of the button serving as a blocking means of the button with said operation mode change-over means; and an opening provided in a position of the change-over means which is capable of receiving said projection when the apparatus is in its inoperative state for allowing the movement of the lifting button.

* * * * *